(12) United States Patent
Yamamoto

(10) Patent No.: US 10,183,692 B2
(45) Date of Patent: Jan. 22, 2019

(54) DRIVING DEVICE

(71) Applicant: DENSO CORPORATION, Kariya, Aichi-pref. (JP)

(72) Inventor: Naohiro Yamamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 185 days.

(21) Appl. No.: 15/097,706

(22) Filed: Apr. 13, 2016

(65) Prior Publication Data

US 2016/0304118 A1  Oct. 20, 2016

(30) Foreign Application Priority Data

Apr. 17, 2015 (JP) ................. 2015-084836

(51) Int. Cl.
*H02K 5/04* (2006.01)
*H02K 5/15* (2006.01)
*B62D 5/04* (2006.01)

(52) U.S. Cl.
CPC .............. *B62D 5/0406* (2013.01); *H02K 5/04* (2013.01); *H02K 5/15* (2013.01)

(58) Field of Classification Search
CPC .................................. H02K 5/04; H02K 5/15
USPC ........................................................... 310/89
IPC ................................................. H02K 5/04,5/15
See application file for complete search history.

(56) References Cited

U.S. PATENT DOCUMENTS

| | | | | |
|---|---|---|---|---|
| 6,169,345 B1 | 1/2001 | Bloch et al. | | |
| 6,321,563 B1 * | 11/2001 | Ikeda | ................ | F04B 49/06 184/6.16 |
| 6,483,213 B1 * | 11/2002 | Hsu | ................ | H02K 3/522 310/68 R |
| 7,837,002 B2 * | 11/2010 | Kanda | ................ | B62D 5/0409 180/444 |
| 8,471,417 B2 * | 6/2013 | Fujita | ................ | H01L 24/40 310/43 |
| 9,742,244 B2 * | 8/2017 | Matsuo | ................ | H02K 9/22 |
| 2010/0052445 A1 * | 3/2010 | Kingrey | ................ | H02K 5/15 310/89 |
| 2011/0018374 A1 * | 1/2011 | Yamasaki | ................ | H01L 23/36 310/64 |
| 2012/0007456 A1 * | 1/2012 | Hein | ................ | F16J 15/062 310/89 |
| 2012/0098361 A1 | 4/2012 | Yamasaki et al. | | |

(Continued)

FOREIGN PATENT DOCUMENTS

| | | |
|---|---|---|
| JP | 2004-254485 | 9/2004 |
| JP | 2011-160642 | 8/2011 |

*Primary Examiner* — John K Kim
(74) *Attorney, Agent, or Firm* — Knobbe, Martens, Olson & Bear LLP

(57) ABSTRACT

A driving device includes a motor portion, a control portion, a casing, a first frame end, a second frame end, and a fixation member. The first frame end or the second frame end, which is fixed to the casing, includes a plurality of first flange portions protruding outward in a radial direction of the motor portion. The casing includes a plurality of second flange portions corresponding to the plurality of first flange portions, the plurality of second flange portions being fixed to the first flange portions by the fixation member. The plurality of first flange portions and the plurality of second flange portions are located inside an imaginary square circumscribing the casing in cross-section perpendicular to the axial direction of the motor portion.

2 Claims, 12 Drawing Sheets

(56) References Cited

U.S. PATENT DOCUMENTS

| | | | |
|---|---|---|---|
| 2012/0098365 A1* | 4/2012 | Yamasaki | B62D 5/0406 |
| | | | 310/71 |
| 2012/0098366 A1 | 4/2012 | Yamasaki et al. | |
| 2012/0098391 A1 | 4/2012 | Yamasaki et al. | |
| 2012/0104886 A1* | 5/2012 | Yamasaki | B62D 5/0406 |
| | | | 310/71 |
| 2013/0249356 A1 | 9/2013 | Nakano et al. | |
| 2014/0076653 A1 | 3/2014 | Ochiai et al. | |
| 2016/0006324 A1 | 1/2016 | Akutsu et al. | |
| 2016/0304118 A1* | 10/2016 | Yamamoto | B62D 5/0406 |

* cited by examiner

DRIVING DEVICE

CROSS REFERENCE TO RELATED APPLICATION

This application is based on and incorporates herein by reference Japanese Patent Application No. 2015-084836 filed on Apr. 17, 2015.

TECHNICAL FIELD

The present disclosure relates to a driving device used in an electric power steering apparatus.

BACKGROUND

A driving device used in an electric power steering apparatus is commonly known. Patent Document 1 (JP 2011-177001 A corresponding to US 2012/0098366 A1, US 2012/0098391 A1) discloses a driving device including both mechanical system and electrical system in which a motor portion generating a steering assist torque and a control portion controlling an energization of the motor portion are provided integrally with each other. A semiconductor module of the control portion of the driving device is arranged along an axial direction, and accordingly the driving device is downsized in a radial direction.

In the driving device disclosed in Patent Document 1, the motor portion is housed in a casing having a cylindrical shape. A first frame end provided as a part of the casing is located on one end of the casing. A second frame end is provided on the other end of the casing. Each of the second frame end and the casing includes three flange portions protruding outward in a radial direction. The flange portions of the second frame end are fixed to the flange portions of the casing by bolts.

By the way, the driving device is categorized into column assist type, pinion assist type, rack assist type and so on according to a portion to which an assist torque is transmitted. The driving device that is column assist type is located close to a column shaft. The driving device that is pinion assist type is located close to a rack-and-pinion mechanism. The driving device that is rack assist type is located close to a rack shaft. Whichever type is chosen, in recent vehicles including various devices besides the driving device, it is required to provide spaces for mounting various devices.

The driving device disclosed in Patent Document 1 is configured so that the control portion is housed inside an outer diameter of the casing.

SUMMARY

It is an objective of the present disclosure to provide a driving device superior in mountability.

According to an aspect of the present disclosure, a driving device used as a power source of an electric power steering apparatus includes a motor portion, a control portion, a casing, a first frame end, a second frame end, and a fixation member. The motor portion includes a stator, a rotor rotatably provided inside the stator, and a shaft rotating integrally with the rotor. The control portion is provided on one side of the motor portion in an axial direction of the shaft and controls an energization of the motor portion. The casing has a cylindrical shape and houses the motor portion. The first frame end is located between the motor portion and the control portion. The first frame end holds the control portion and supports the shaft. The second frame end is located on an opposite side of the motor portion from the control portion. The second frame end supports the shaft. The fixation member fixes the first frame end or the second frame end to the casing. The first frame end or the second frame end, which is fixed to the casing, includes a plurality of first flange portions protruding outward in a radial direction of the motor portion. The casing includes a plurality of second flange portions corresponding to the plurality of first flange portions, the plurality of second flange portions being fixed to the first flange portions by the fixation member. The plurality of first flange portions and the plurality of second flange portions are located inside an imaginary square circumscribing the casing in cross-section perpendicular to the axial direction of the shaft.

According to another aspect of the present disclosure, a driving device used as a power source of an electric power steering apparatus includes a motor portion, a control portion, a first frame end, a second frame end, and a fixation member. The motor portion includes a stator, a rotor rotatably provided inside the stator, and a shaft rotating integrally with the rotor. The control portion is provided on one side of the motor portion in an axial direction of the shaft and controls an energization of the motor portion. The first frame end is located between the motor portion and the control portion. The first frame end holds the control portion and supports the shaft. The second frame end is located on an opposite side of the motor portion from the control portion. The second frame end supports the shaft. The fixation member fixes the first frame end and the second frame end to each other. The first frame end includes a plurality of first flange portions protruding outward in a radial direction of the motor portion. The second frame end includes a plurality of second flange portions corresponding to the first flange portions and being fixed to the first flange portions by the fixation member. The plurality of first flange portions and the plurality of second flange portions are located inside an imaginary square circumscribing the stator in cross-section perpendicular to the axial direction of the shaft.

The driving device configured in this manner has an improved mountability compared to a driving device in which first flange portions and second flange portions are located outside such imaginary square. According to the present disclosure, in a rack assist type that is arranged between a rack shaft and a ground, for example, an installation space for the driving device between the rack shaft and the ground can be reduced to be almost as small as an outer diameter of the casing or the stator by mounting the driving device so that one side of the imaginary square is approximately parallel to the ground.

In contrast, if the first flange portions and the second flange portions are located outside the imaginary square, one flange portion is located at a position interfering with the rack shaft even if the driving device is arranged so that the ground is located between the other two flanges in the circumferential direction. Accordingly, in this case, the space for mounting the driving device between the rack shaft and the ground may become inevitably large.

In a column assist type and a pinion assist type, the same thing can be said as the rack assist type. The above-described "ground" is just changed into a "peripheral device" in case of the column assist type and the pinion assist type, for example. Therefore, the driving device of the present disclosure is superior in mountability.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
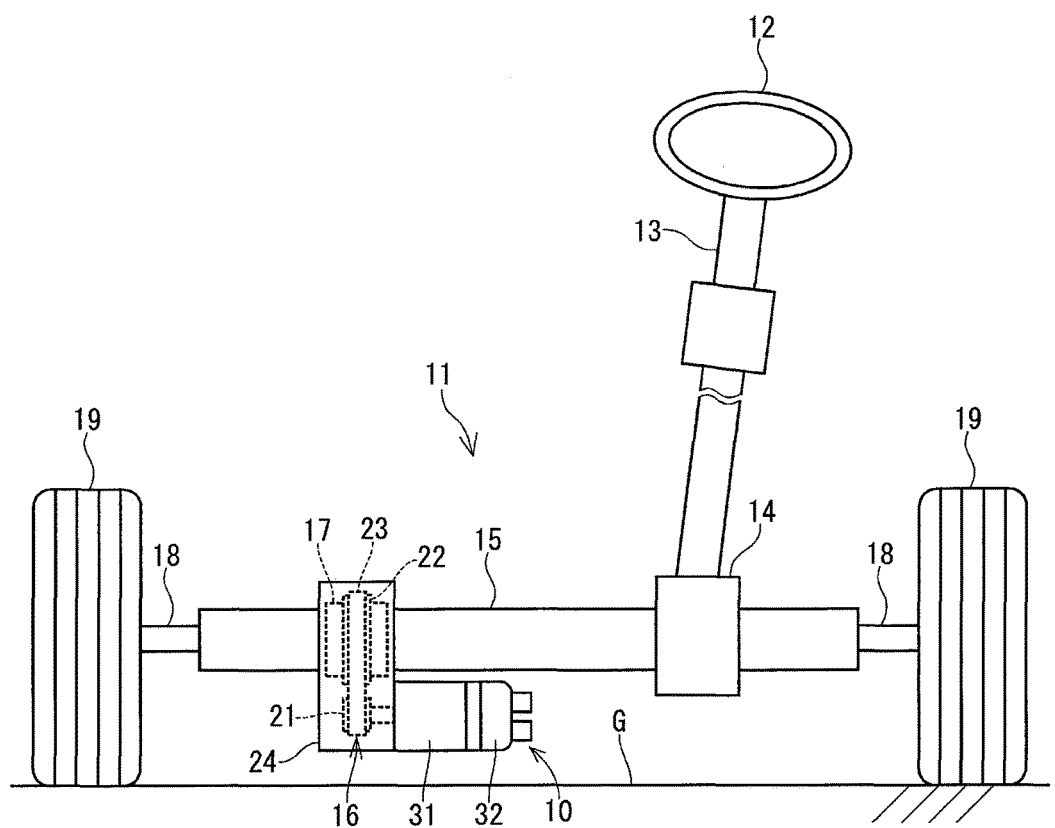
FIG. 1 is a diagram illustrating an electric power steering apparatus including a driving device according to a first embodiment of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A driving device 10 according to a first embodiment of the present disclosure is shown in FIG. 1. The driving device 10 is used in an electric power steering apparatus 11 that assists a driver steering of a vehicle.

First, a configuration of the electric power steering apparatus 11 will be described below referring to FIG. 1. As shown in FIG. 1, the electric power steering apparatus 11 includes a steering wheel 12, a column shaft 13, a rack-and-pinion mechanism 14, a rack shaft 15, the driving device 10, a reducer mechanism 16, a ball nut 17 and a tie rod 18, for example.

A rotational motion of the steering wheel 12 caused by a driver is transmitted to the rack-and-pinion mechanism 14 through the column shaft 13, for example, and changed into a straight motion of the rack shaft 15 by the rack-and-pinion mechanism 14. A rotational motion of a shaft 41 of the driving device 10 is transmitted to the ball nut 17 through the reducer mechanism 16 and changed into a straight motion of the rack shaft 15 by the ball nut 17. The straight motion of the rack shaft 15 is transmitted to a wheel 19 through the tie rod 18. A traveling direction of the wheel 19 is changed according to an amount of the straight motion of the rack shaft 15.

The reducer mechanism 16 has a belt drive system, for example, and includes a small pulley 21 fixed to the shaft 41 of the driving device 10, a large pulley 22 fixed to the ball nut 17, and a belt 23 engaged with both the small pulley 21 and the large pulley 22. The reducer mechanism 16 and the ball nut 17 are accommodated in a housing 24. The reducer mechanism 16 is not limited to one having the belt drive system and may have another system such as a gear reduction system. A mechanism transmitting a driving power at a same speed or a higher speed may be provided instead of the reducer mechanism 16.

The driving device 10 is used as a power source of the electric power steering apparatus 11. The driving device 10 is an actuator including both mechanical and electrical systems, in which a motor portion 31 generating a steering assist torque and a control portion 32 controlling an energization of the motor portion 31 are integrated with each other. In the present embodiment, the driving device 10 is arranged between the rack shaft 15 and a ground G and fixed to an outer wall of the housing 24. The housing 24 may be used as an example of an attachment object to which the driving device 10 is attached. The driving device 10 arranged in this manner is required to be small, especially in a radial direction, so as to be mounted in a limited space between the rack shaft 15 and the ground G.

Figure 2:
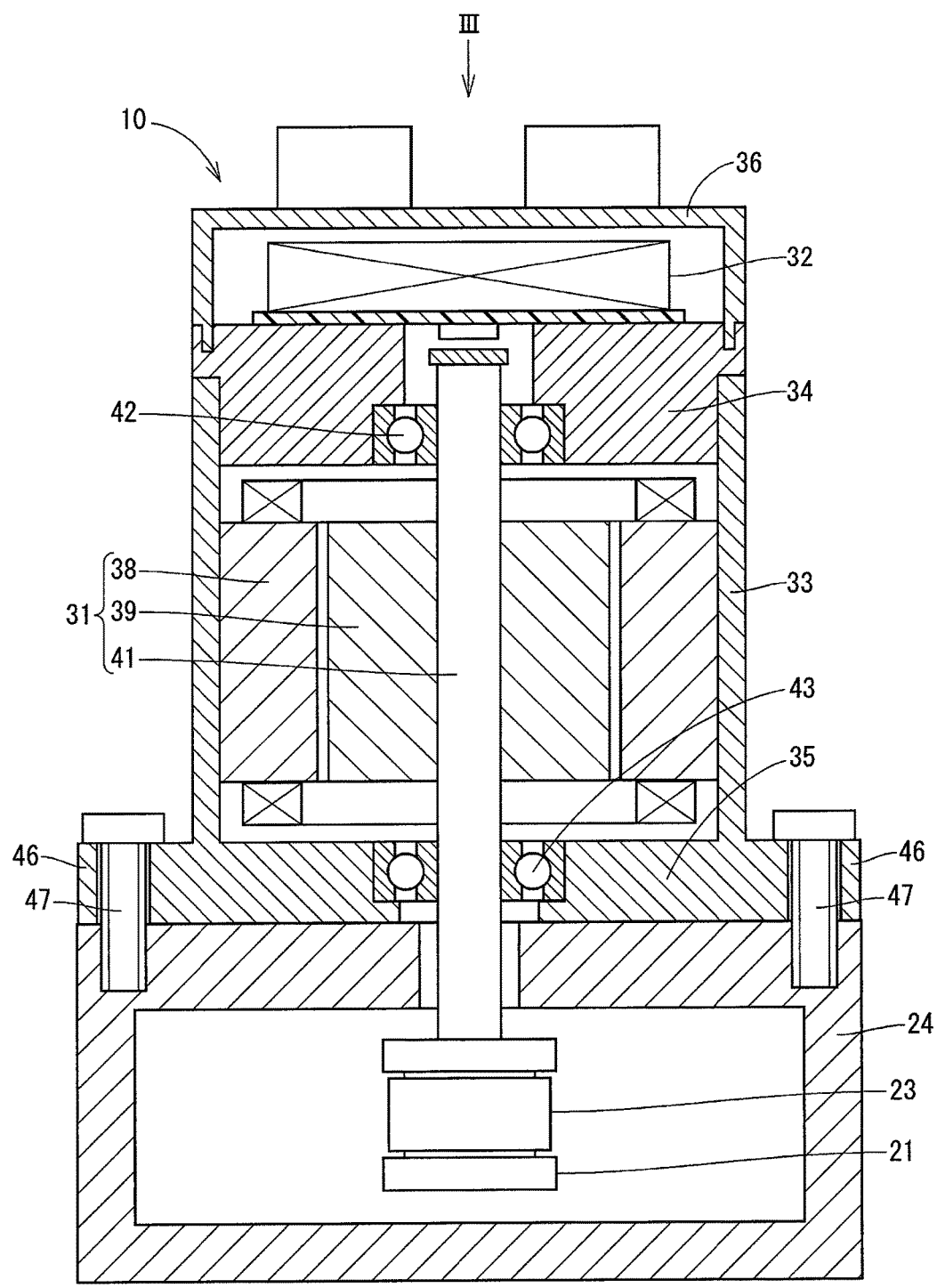
FIG. 2 is a sectional diagram taken along a line II-II of FIG. 3 and illustrating the driving device according to the first embodiment.
Figure 3:
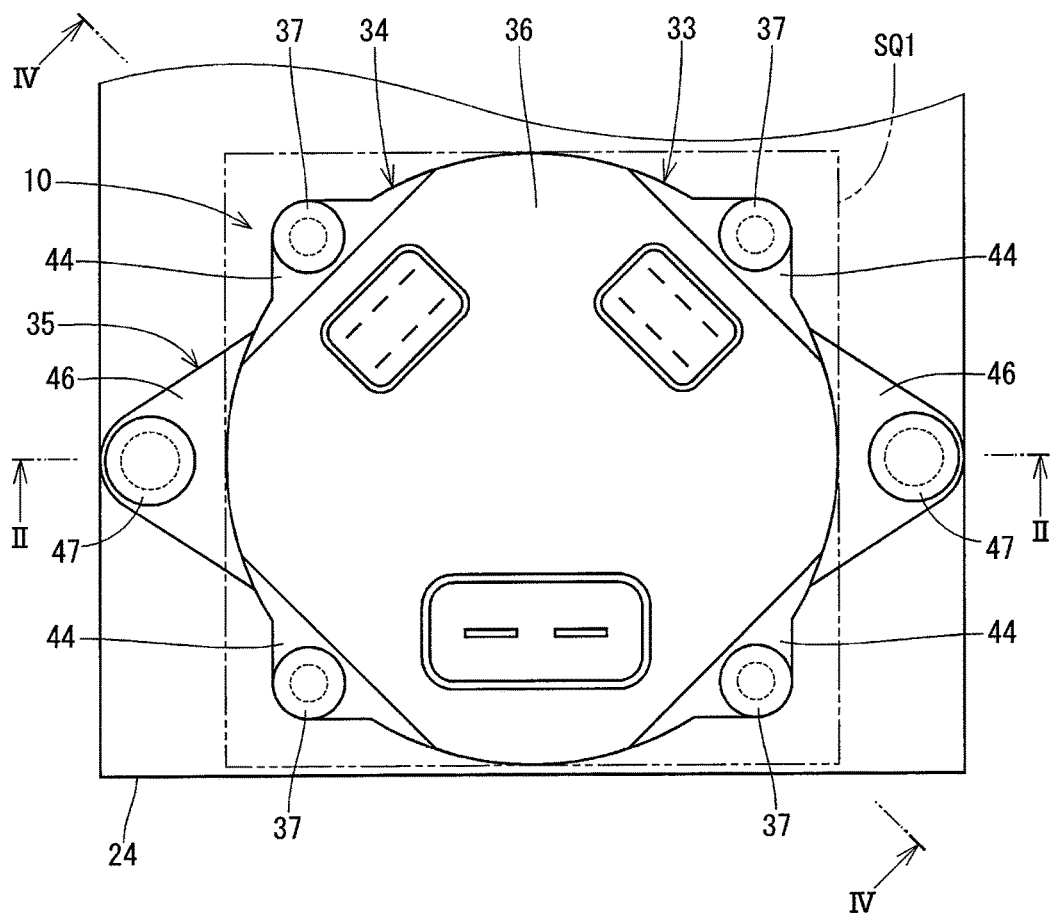
FIG. 3 is a diagram illustrating the driving device viewed in a direction of an arrow III of FIG. 2, according to the first embodiment.
Figure 4:
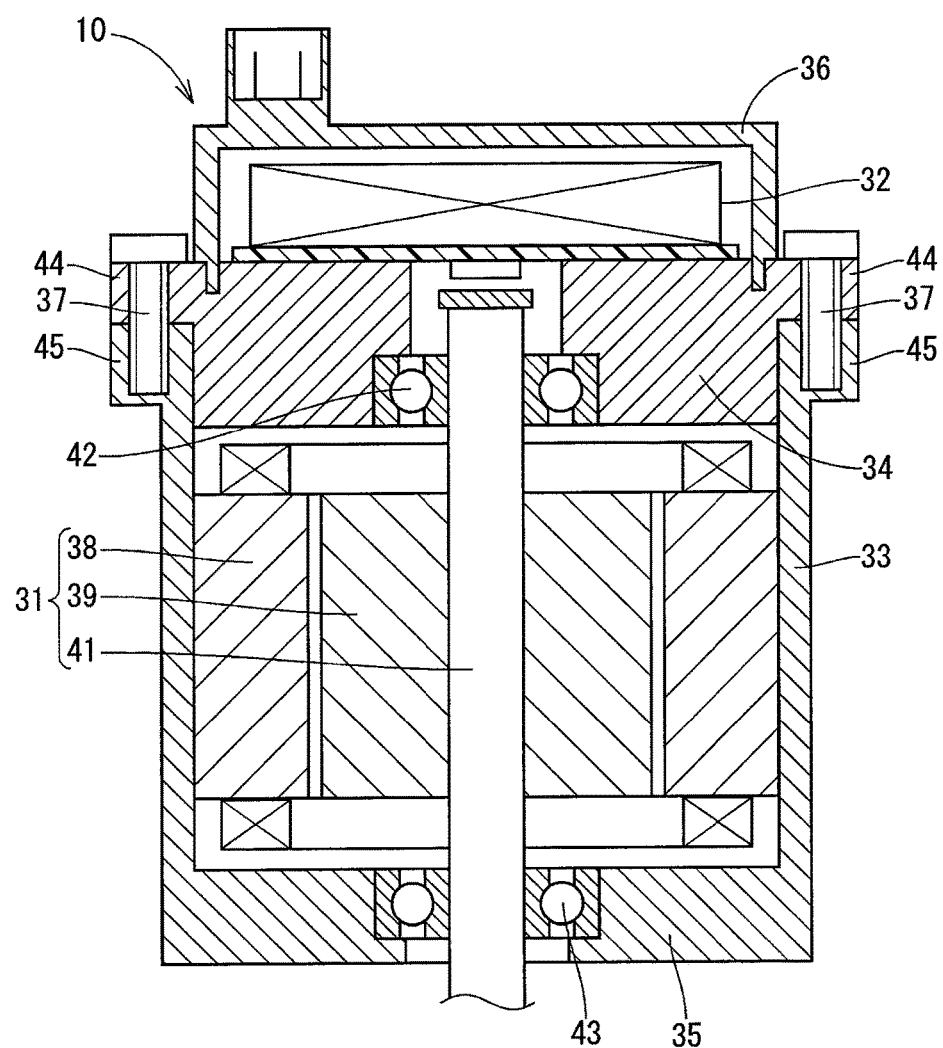
FIG. 4 is a sectional diagram taken along a line IV-IV of FIG. 3.

Next, a configuration of the driving device 10 will be described below referring to FIGS. 2 to 4. As shown in FIGS. 2 to 4, the driving device 10 includes a motor portion 31, a control portion 32, a casing 33, a first frame end 34, a second frame end 35, a control portion cover 36 and a bolt 37, for example. The motor portion 31 includes a stator 38, a rotor 39 rotatably provided inside the stator 38, and the shaft 41 rotating integrally with the rotor 39.

The control portion 32 is provided on one side of the motor portion 31 in an axial direction. The control portion 32 includes an electric member such as a power module of an inverter and a microcomputer. The control portion 32 controls an electrical energization of the motor portion 31 based on signals sent from various sensors. The casing 33 has a cylindrical shape and houses the motor portion 31. The stator 38 is fixed to an inner wall of the casing 33 by press-fitting, for example.

The first frame end 34 is located between the motor portion 31 and the control portion 32, and the first frame end 34 holds the control portion 32. In the present embodiment, the first frame end 34 functions as a heat sink receiving (e.g. absorbing) a heat radiated from the control portion 32. Hence, the first frame end 34 has a function as an outer shell of the motor portion 31 and a function as the heat sink. The first frame end 34 supports the shaft 41 through a bearing 42 provided in a central portion of the first frame end 34.

The second frame end 35 is located on an opposite side of the motor portion 31 from the control portion 32. The second frame end 35 supports the shaft 41 through a bearing 43 provided in a central portion of the second frame end 35. In the present embodiment, the second frame end 35 and the casing 33 are provided as a single component. The control portion cover 36 has a cup-like shape and houses the control portion 32. In the present embodiment, the control portion cover 36 is bonded to the first frame end 34 by adhesion, for example.

The first frame end 34 includes four flange portions 44 protruding outward in a radial direction. The flange portions 44 are arranged at regular intervals in a circumferential direction. The flange portion 44 may be used as an example of a first flange portion protruding outward in the radial direction. The casing 33 includes four flange portions 45 protruding outward in the radial direction. The flange portions 45 are arranged at regular intervals in the circumferential direction. The flange portions 45 are arranged to correspond to the flange portions 44 and may be used as an example of a second flange portion protruding outward in the radial direction.

The bolt 37 fixes the flange portion 44 of the first frame end 34 and the flange portion 45 of the casing 33 to each other. The bolt 37 may be used as an example of a fixation member fixing the first frame end 34 or the second frame end 45. The flange portion 44 and the flange portion 45 are located inside an imaginary square SQ1 circumscribing the casing 33 in cross-section perpendicular to an axial direction of the shaft 41.

The second frame end 35 includes two flange portions 46 protruding outward in the radial direction. The flange portions 46 are arranged at regular intervals in the circumferential direction. The flange portion 46 is fixed to the housing 24 by a bolt 47 and may be used as an example of a third flange portion protruding outward in the radial direction and fixed to the housing 24. In the present embodiment, the second frame end 35 is fixed to the housing 24 so that one side of the square SQ1 is parallel to the ground G. The second frame end 35 may be fixed to the housing 24 so that the ground G is located between two flange portions 46 in the circumferential direction.

Effects of the present embodiment will be described below. In the first embodiment, the first frame end 34 includes the multiple flange portions 44 protruding outward in the radial direction, as described above. The casing 33 includes the multiple flange portions 45 provided to correspond to the flange portions 44 and fixed to the flange portions 44 by the bolts 37. The flange portions 44 and the flange portions 45 are located inside the imaginary square SQ1 circumscribing the casing 33 in cross-section perpendicular to the axial direction of the shaft 41.

Since the driving device 10 has such configuration, mountability of the driving device 10 can be improved as compared to a driving device in which the flange portion is located outside the imaginary square SQ1. According to the first embodiment, when the driving device 10 is a rack assist type located between the rack shaft 15 and the ground G, the driving device 10 may be arranged such that one side of the imaginary square SQ1 is approximately parallel to the ground G. Accordingly, an installation space for the driving device 10 between the rack shaft 15 and the ground G can be reduced to be almost as small as an outer diameter of the casing 33.

In contrast, if the driving device 10 includes three flange portions, and at least one flange portion is located outside the imaginary square SQ1, the one flange portion interferes with the rack shaft 15 even if the driving device 10 is mounted so that the ground G is located between the other two flange portions in the circumferential direction. Accordingly, in this case, the installation space for the driving device 10 between the rack shaft 15 and the ground G becomes inevitably large. Hence, the driving device 10 according to the first embodiment is superior in mountability.

In the first embodiment, the first frame end 34 functions as a heat sink receiving a heat radiated from the control portion 32. Therefore, the number of components can be reduced compared to a configuration including a heat sink additionally.

In the first embodiment, the four flange portions 44 are arranged at regular intervals in the circumferential direction. Therefore, a force applied to each bolt 37 becomes small compared to a case where three flange portions are provided, and accordingly the casing 33 and the first frame end 34 are fixed strongly.

Second Embodiment

Figure 5:
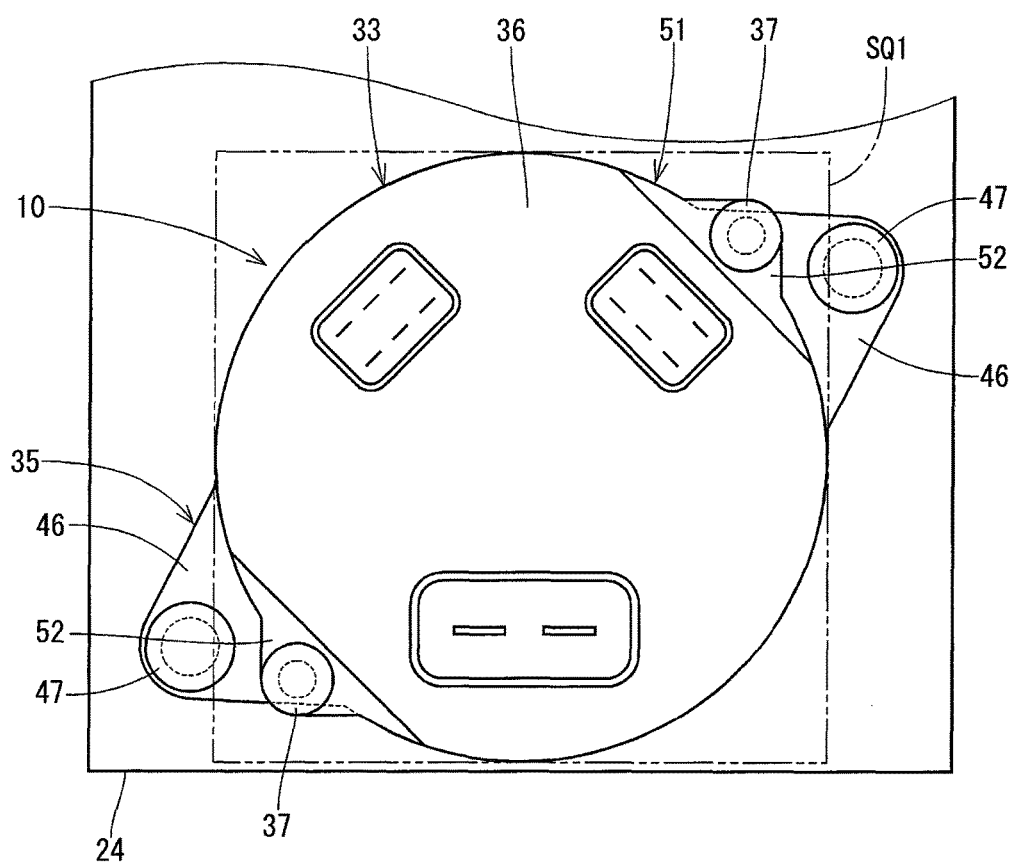
FIG. 5 is a diagram illustrating a driving device according to a second embodiment of the present disclosure.

In a second embodiment of the present disclosure, as shown in FIG. 5, the number of flange portions 52 of a first frame end 51 is two. Two flange portions 52 of the first frame end 51 are arranged at regular intervals in a circumferential direction. The flange portions 52 are located inside an imaginary square SQ1 Even when the number of flange portions 52 is two, the same effects as a first embodiment can be obtained by locating the flange portions 52 inside the square SQ1.

In the second embodiment, the flange portions 52 are located so that at least a part of the flange portions 52 overlaps flange portions 46 of a second frame end 35 in an axial direction. More specifically, at least a part of each flange portion 52 overlaps one of the flange portions 46 in the axial direction. Therefore, a size of a driving device 10 viewed in the axial direction becomes small, and accordingly a mountability can be improved.

Third Embodiment

Figure 6:
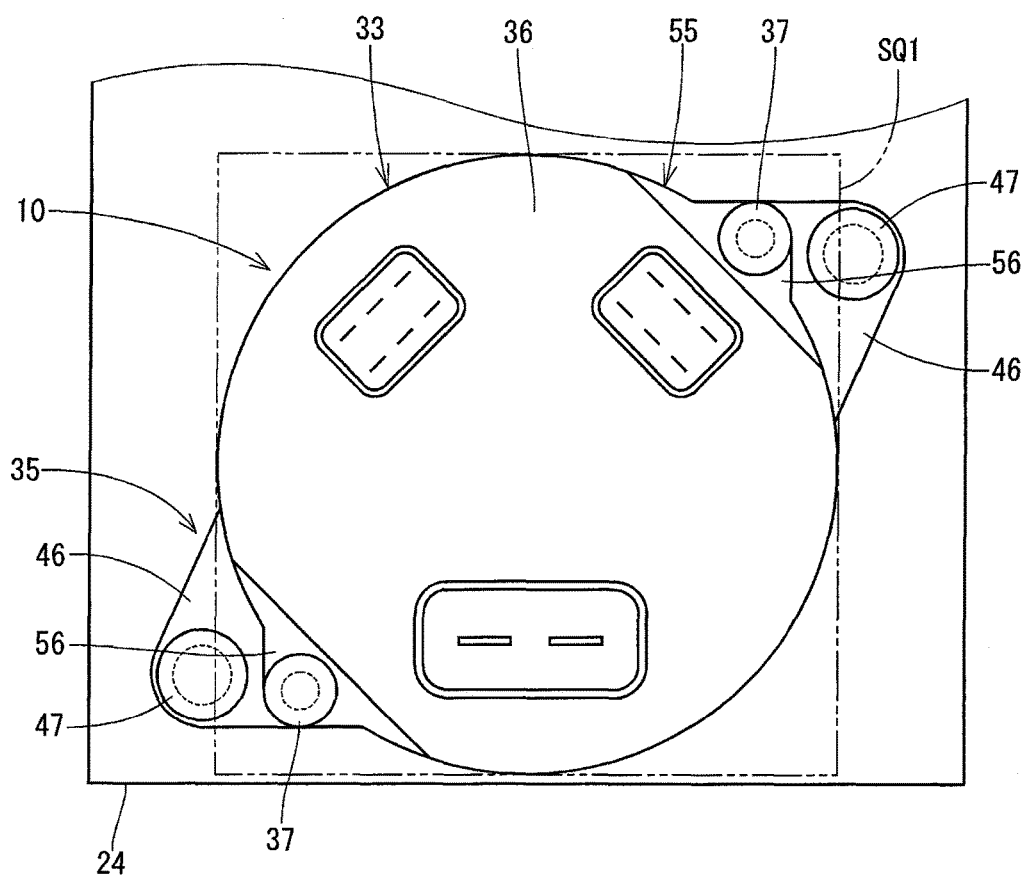
FIG. 6 is a diagram illustrating a driving device according to a third embodiment of the present disclosure.

In a third embodiment of the present disclosure, as shown in FIG. 6, the number of flange portions 56 of a first frame end 55 is two. Two flange portions 56 of the first frame end 55 are arranged at regular intervals in a circumferential direction. The flange portions 56 are located inside an imaginary square SQ1.

The flange portions 56 are located so as to completely overlap flange portions 46 of a second frame end 35 in an axial direction. More specifically, each flange portion 56 completely overlaps one of the flange portions 46. Therefore, a size of a driving device 10 viewed in the axial direction becomes smaller than a second embodiment, and accordingly a mountability can be further improved.

Fourth Embodiment

Figure 7:
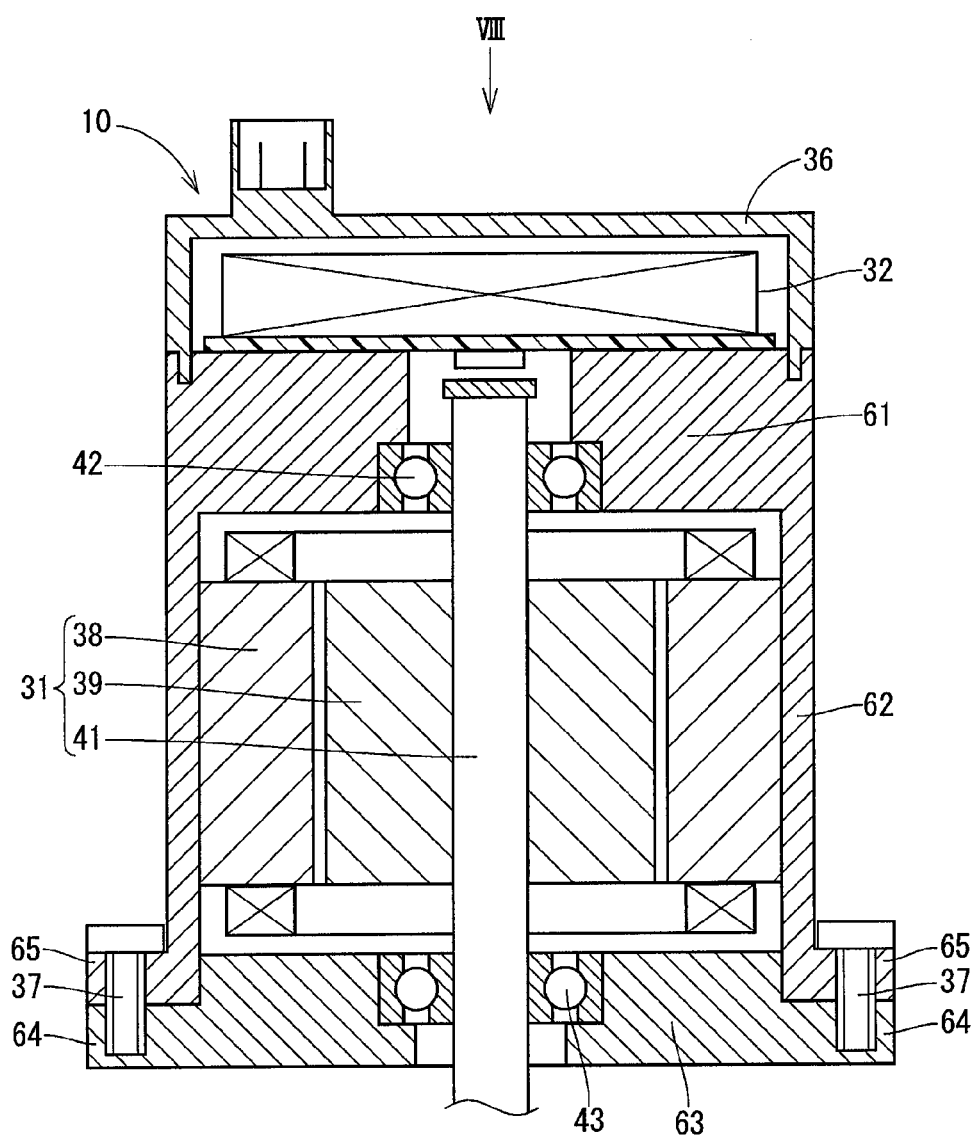
FIG. 7 is a diagram illustrating a driving device according to a fourth embodiment of the present disclosure.
Figure 8:
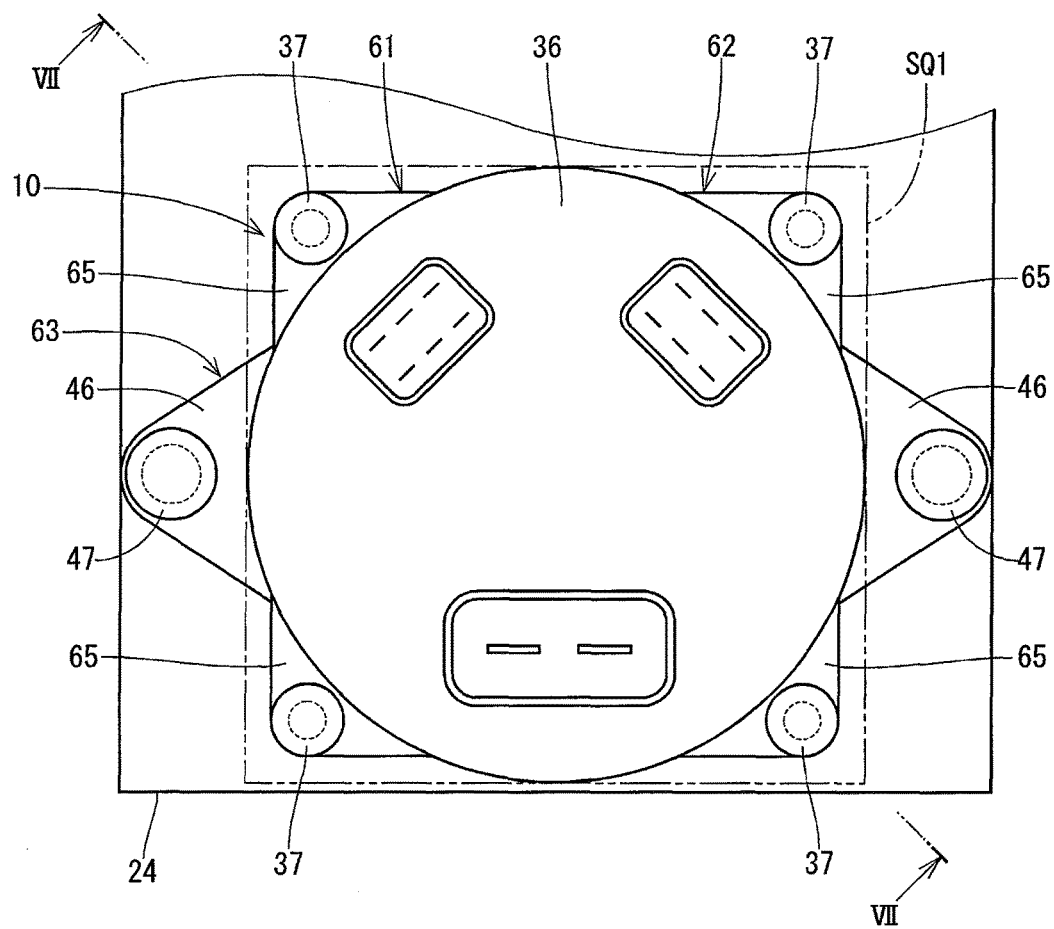
FIG. 8 is a diagram illustrating the driving device viewed in a direction of an arrow VIII of FIG. 7, according to the fourth embodiment.

In a fourth embodiment of the present disclosure, as shown in FIGS. 7 and 8, a first frame end 61 and a casing 62 are provided as a single component. A second frame end 63 includes four flange portions 64 protruding in a radial direction. The casing 62 includes four flange portions 65 corresponding to the flange portion 64. Bolts 37 fix the flange portions 64 of the second frame end 63 and the flange portions 65 of the casing 62. The flange portions 64, 65 are located inside an imaginary square SQ1. Even when the flange portion 64 is provided on the second flame end 63, the same effects as a first embodiment can be obtained by locating the flange portion 64 inside the square SQ1.

Fifth Embodiment

Figure 9:
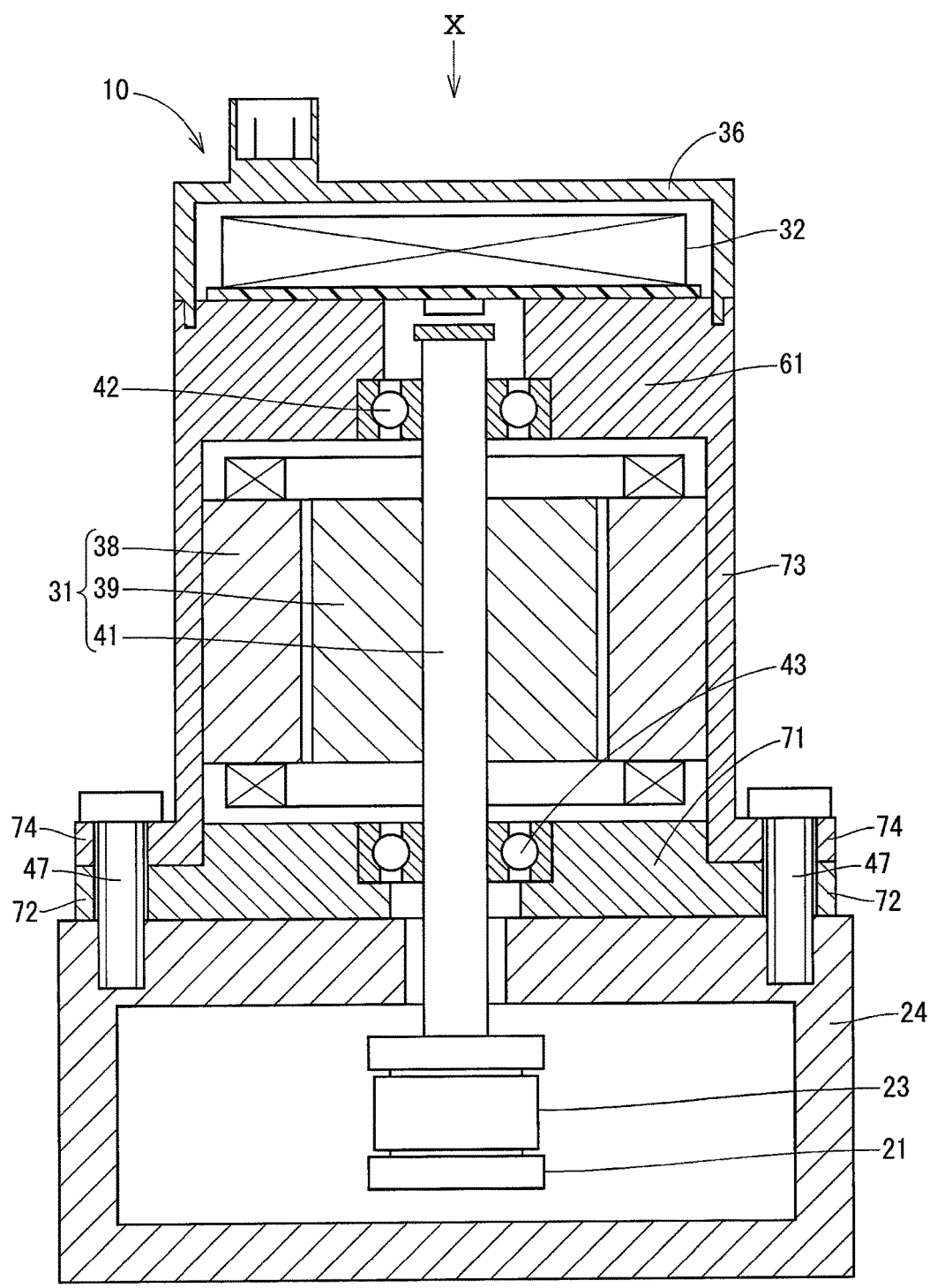
FIG. 9 is a sectional diagram taken along a line IX-IX of FIG. 10 and illustrating a driving device according to a fifth embodiment of the present disclosure.
Figure 10:
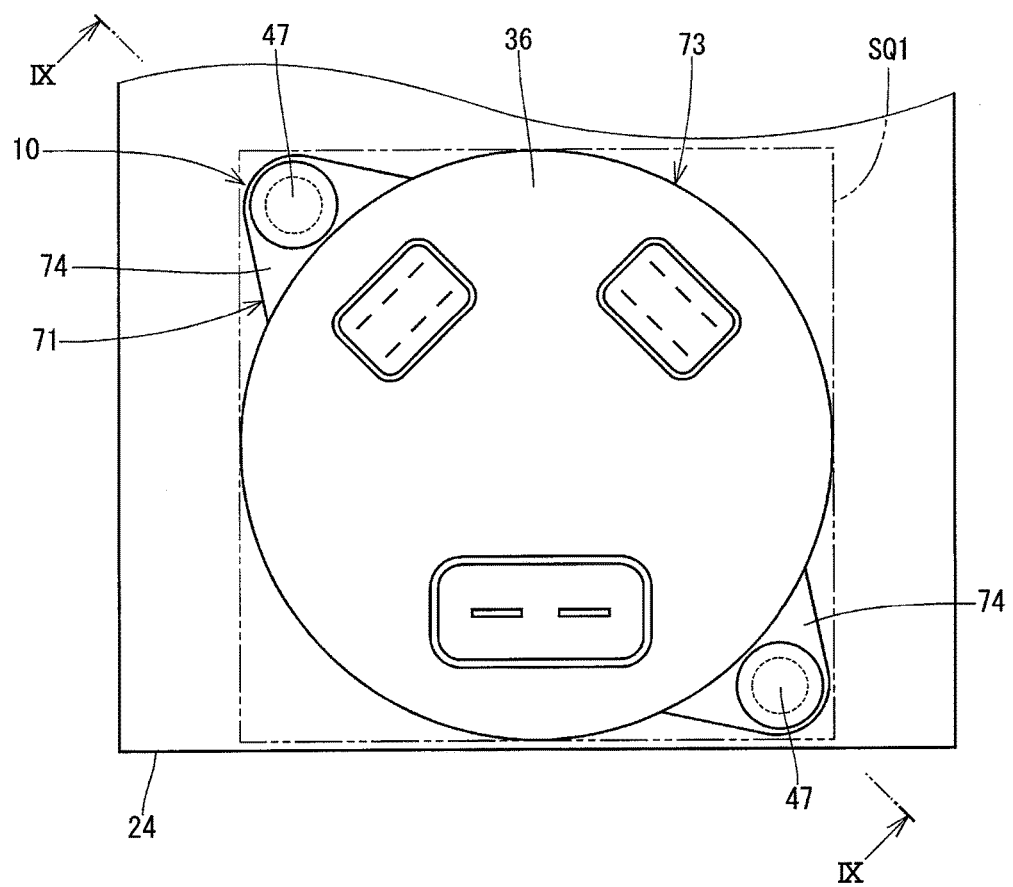
FIG. 10 is a diagram illustrating the driving device viewed in a direction of an arrow X of FIG. 9, according to the fifth embodiment.

In a fifth embodiment of the present disclosure, as shown in FIGS. 9 and 10, Bolt 47 fix flange portions 72 of a second frame end 71, flange portions 74 of a casing 73, and a housing 24. Hence, the flange portions 72 and the flange portions 74 are fixation portions fixing the second frame end 71 to the casing 73, and are fixation portions fixing the driving device 10 to the housing 24. The flange portions 72, 74 are located inside an imaginary square SQ1. Therefore, a size of the driving device 10 viewed in an axial direction becomes small compared to a case like the first embodiment in which the flange portions 46 fixing the driving device 10 to the housing 24 are provided in addition to the flange portions 44 and 45, and accordingly a mountability can be further improved.

Sixth Embodiment

Figure 11:
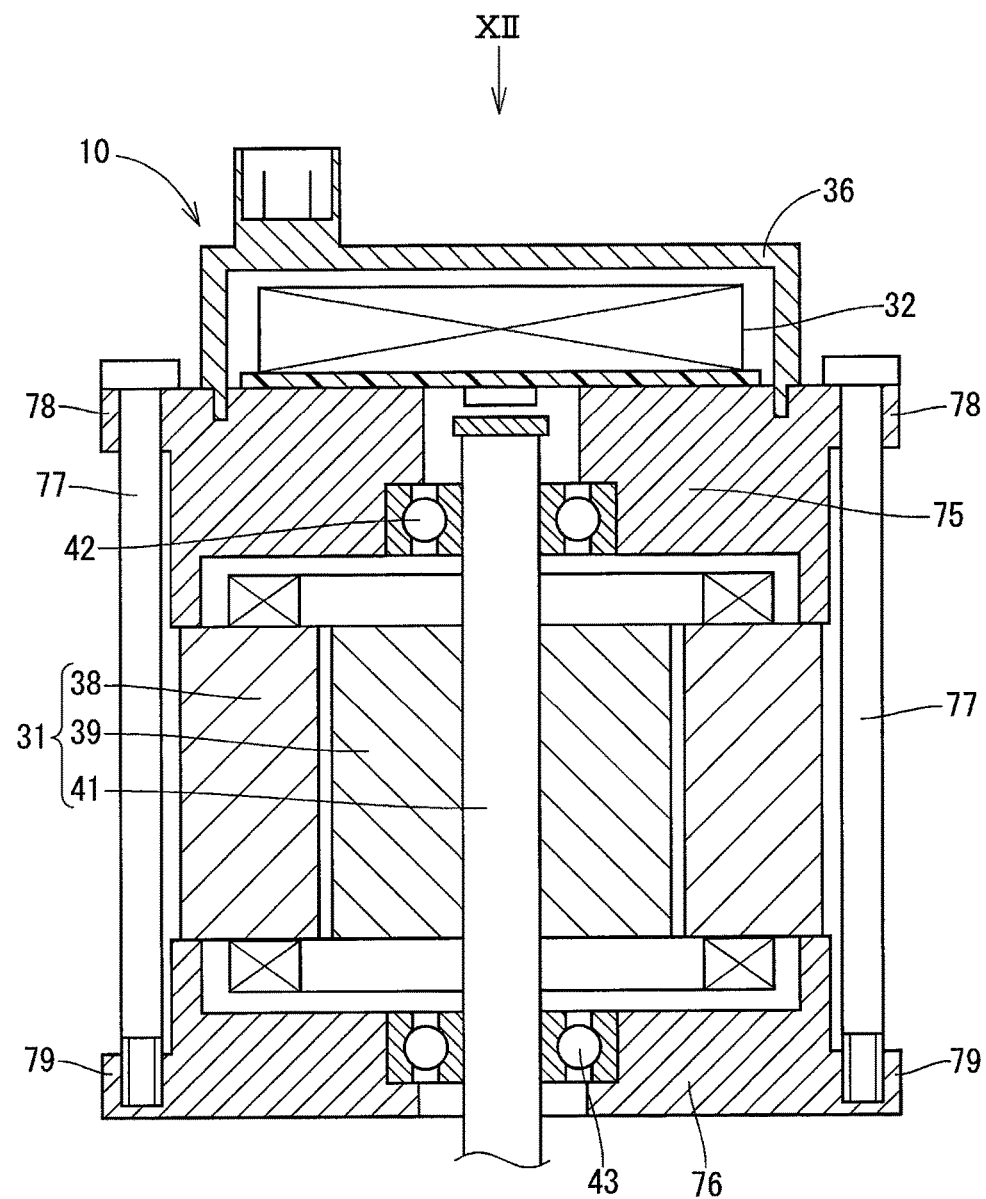
FIG. 11 is a sectional diagram taken along a line XI-XI of FIG. 12 and illustrating a driving device according to a sixth embodiment of the present disclosure; and, FIG. 12 is a diagram illustrating the driving device viewed in a direction of an arrow XII of FIG. 11, according to the sixth embodiment.
Figure 12:
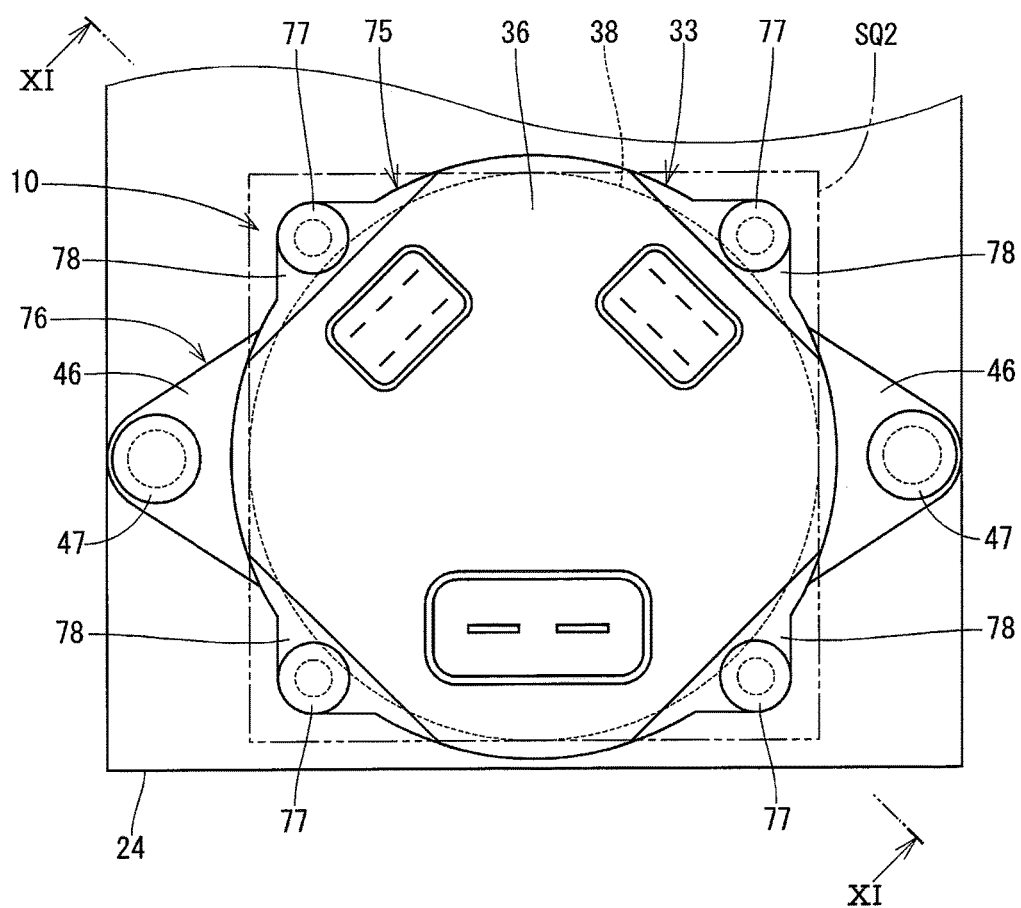

In a sixth embodiment of the present disclosure, as shown in FIG. 11, a driving device 10 does not include a casing. A stator 38 is interposed to be held between a first frame end 75 and a second frame end 76. Through bolts 77, which may be used as an example of the fixation member, fix flange portions 78 of the first frame end 75 and flange portions 79 of the second frame end 76. The flange portions 78 and the flange portions 79 are located inside an imaginary square SQ2 circumscribing a stator 38 in cross-section perpendicular to an axial direction of a shaft 41. Even when the casing is not provided, and the first frame end 75 and the second frame end 76 are fixed to each other, the same effects as a first embodiment can be obtained by locating the flange portions 78 and the flange portions 79 inside the square SQ2.

Although the present disclosure has been fully described in connection with the preferred embodiments thereof with reference to the accompanying drawings, it is to be noted that various changes and modifications will become apparent to those skilled in the art. Both the first frame end and the second frame end may be separately provided from the casing. In this situation, the flange portions of the first frame end and the flange portions of the casing may be fixed to each other by bolts, and the flange portions of the second frame end and flange portions of the casing different from the flange portions fixed to the flange portions of the first frame end may be fixed to each other by bolts. Alternatively, the flange portions of either the first frame end or the second frame end and the flange portions of the casing may be fixed to each other by bolts, the other frame end may be fixed to the casing by press-fitting, for example.

The flange portions of the first frame end, the flange portions of the second frame end, and the flange portions of the casing may be arranged at irregular intervals in the circumferential direction.

Additional advantages and modifications will readily occur to those skilled in the art. The disclosure in its broader terms is therefore not limited to the specific details, representative apparatus, and illustrative examples shown and described.

What is claimed is:

1. A driving device used as a power source of an electric power steering apparatus, the driving device comprising:
    a motor portion including a stator, a rotor rotatably provided inside the stator, and a shaft rotating integrally with the rotor;
    a control portion provided on one side of the motor portion in an axial direction of the shaft and controlling an energization of the motor portion;
    a casing having a cylindrical shape and housing the motor portion;
    a first frame end located between the motor portion and the control portion and holding the control portion, the first frame end supporting the shaft;
    a second frame end located on an opposite side of the motor portion from the control portion, the second frame end supporting the shaft; and
    a fixation member fixing the first frame end or the second frame end to the casing,
    wherein:
    the first frame end or the second frame end, which is fixed to the casing, includes a plurality of first flange portions protruding outward in a radial direction of the motor portion,
    the casing includes a plurality of second flange portions corresponding to the plurality of first flange portions, the plurality of second flange portions being fixed to the first flange portions by the fixation member,
    the plurality of first flange portions and the plurality of second flange portions are located inside an imaginary square circumscribing the casing in cross-section perpendicular to the axial direction of the shaft,
    a number of the plurality of the first flange portions is two,
    the first frame end or the second frame end includes third flange portions protruding outward in the radial direction and being configured to be fixed to an external attachment object,
    a number of the third flange portions is two,
    at least a part of the plurality of first flange portions and at least a part of the plurality of second flange portions overlap the third flange portions in the axial direction,
    each of the plurality of first flange portions includes a hole that extends in the axial direction,
    the fixation member extends through the hole, and
    the hole entirely overlaps one of the third flange portions in the axial direction.

2. The driving device according to claim 1, wherein the first frame end includes a heat sink receiving a heat radiated from the control portion.

* * * * *